United States Patent [19]

Gold et al.

[11] Patent Number: 5,301,112
[45] Date of Patent: Apr. 5, 1994

[54] TRANSIENT FREE SYNCHRONIZER FOR AUTOPILOT SYSTEMS

[75] Inventors: Phillip J. Gold, Shelton; Donald L. Fogler, Jr., Milford; James L. Richard, Stratford, all of Conn.

[73] Assignee: United Technologies Corporation, Hartford, Conn.

[21] Appl. No.: 751,438

[22] Filed: Aug. 28, 1991

Related U.S. Application Data

[63] Continuation-in-part of Ser. No. 518,593, May 3, 1990, Pat. No. 5,195,039.

[51] Int. Cl.$^5$ .............................................. B64C 13/18
[52] U.S. Cl. .................................... 364/434; 244/178; 244/182; 244/17.13
[58] Field of Search ................. 364/433, 434; 244/177, 244/178, 182, 17.11, 17.13

[56] References Cited

U.S. PATENT DOCUMENTS

| | | | |
|---|---|---|---|
| 3,815,850 | 6/1974 | Tribuno et al. | 364/434 |
| 4,330,829 | 5/1982 | Fischer et al. | 364/434 |
| 4,371,936 | 2/1983 | Adams et al. | 364/434 |
| 4,377,848 | 3/1983 | Flannigan et al. | 364/434 |
| 4,500,967 | 2/1985 | Murphy et al. | 364/434 |
| 4,626,998 | 12/1986 | Adams et al. | 364/434 |
| 4,645,141 | 2/1987 | McElreath | 364/433 |
| 5,169,090 | 12/1992 | Wright et al. | 364/434 |
| 5,178,307 | 1/1993 | Wright et al. | 364/434 |

*Primary Examiner*—Gary Chin
*Attorney, Agent, or Firm*—Patrick J. O'Shea

[57] ABSTRACT

A transient free synchronizer stores an input trim signal value on command, and provides an output signal value which transitions in a smooth, continuous manner, when the synchronizer is commanded to the store the input signal. Synchronizers are typically used to capture desired aircraft attitude, position, or velocity trim points for use in aircraft autopilot and automatic flight control systems.

6 Claims, 3 Drawing Sheets

TRANSIENT FREE SYNCHRONIZER FOR AUTOPILOT SYSTEMS

The Government has rights in this invention pursuant to a contract awarded by the Department of the Army.

This application is a continuation-in-part of Ser. No. 07/518,593, filed May 3, 1990 by Gold et al, now U.S. Pat. No. 5,195,039.

TECHNICAL FIELD

This invention relates to autopilot systems and more particularly, to a transient free synchronizer which stores a trim value.

BACKGROUND ART

The utilization of a helicopter frequently involves the capturing of a trim position to lock in on aircraft position, speed, altitude, attitude, etcetera. Capturing these trim values is performed by autopilot and automatic flight control systems which include synchronizers to store (i.e., capture) the desired trim. As an example, if a pilot desires to maintain a certain velocity/aircraft attitude, he would capture the velocity/attitude trim by pushing a button on the collective stick, which triggers a synchronizer to store the present value it is receiving, which is indicative of the desired trim position.

Once the trim position has been stored, the output of the synchronizer instantaneously goes to zero, which acts to normalize set points in the autopilot and flight control system with respect to stored trim position. The synchronizer then provides a signal indicative of the difference between the stored trim position, and the current value of the input signal.

The problem with this synchronizer is that its output goes to zero instantaneously when commanded to store the trim value. This instantaneous change causes a transient aircraft response which gives the pilot the perception the aircraft is responding in the wrong direction. Providing such an erroneous perception to the pilot is clearly unacceptable.

DISCLOSURE OF THE INVENTION

An object of the present invention is to provide a transient free synchronizer which reduces vehicle transients when a new trim position is captured by the synchronizer.

According to the present invention, a transient free synchronizer captures trim positions on command, and provides an output signal which transitions in a smooth manner when the capture of the new trim position is commanded, such that no longer is there a transient aircraft response which the pilot perceives as the aircraft responding in the wrong direction.

These and other objects, features and advantages of the present invention will become more apparent in the light of the detailed description of exemplary embodiments thereof, as illustrated by the drawing.

BEST MODE FOR CARRYING OUT THE INVENTION

Hereinafter, an X prefix to a signal name references that signal to the longitudinal axis of the helicopter. A Y prefix references signals to the lateral axis.

Figure 1:
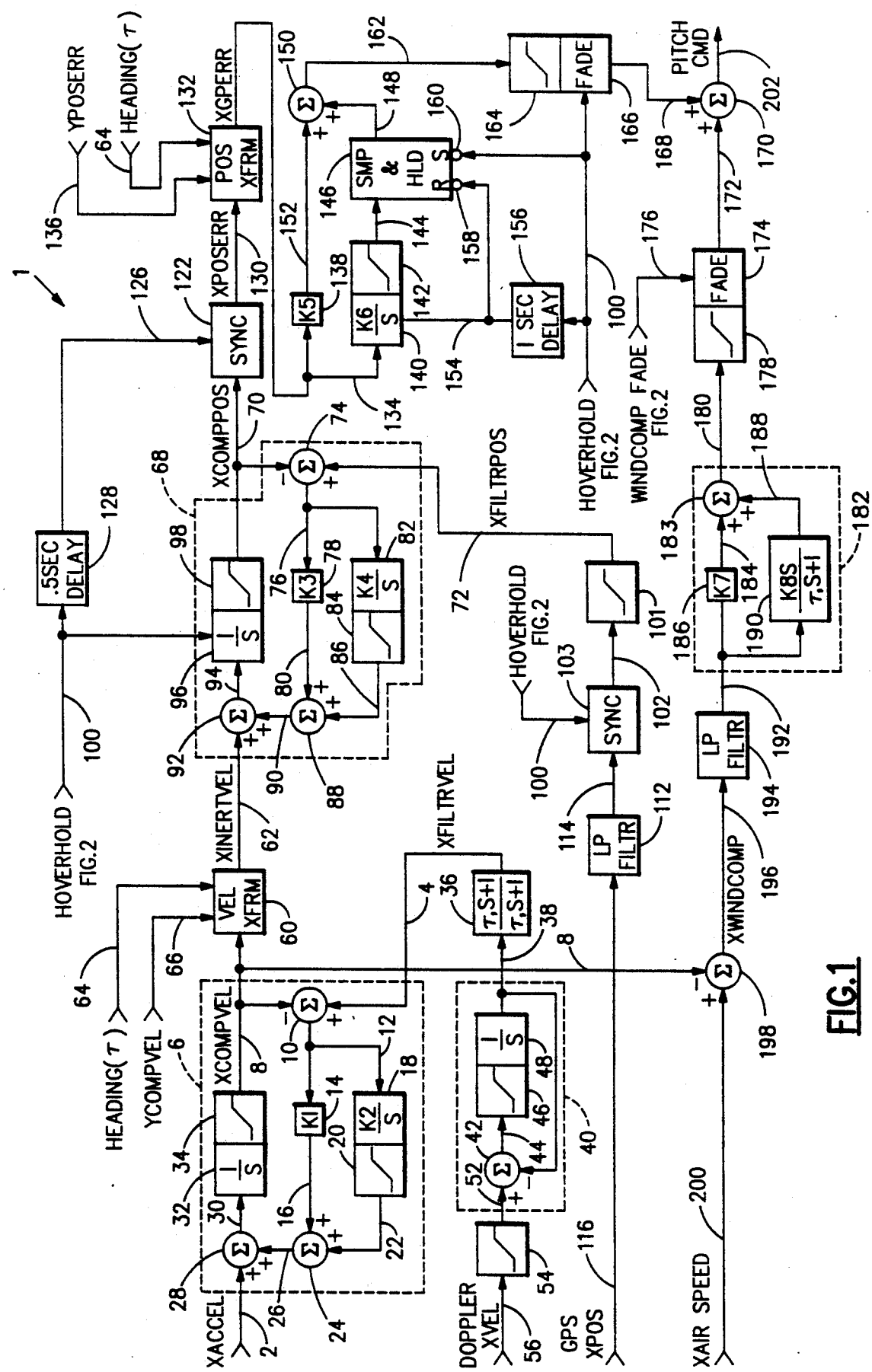
FIG. 1 is a simplified schematic block diagram of the hover hold control system for pitch axis control.

Referring now to FIG. 1, an aircraft pitch command circuit 1 includes an aircraft longitudinal acceleration signal (XACCEL) provided on a line 2 by an acceleration measurement device (not shown), such as an accelerometer, and a filtered, longitudinal, Doppler velocity signal (XFILTRVEL) provided on a line 4 which are combined by a complementary filter 6 to provide a longitudinal, complementary, velocity signal (XCOMPVEL) on a line 8.

Complementary filters are devices known in the prior art which merge two independently generated signals to provide a single output indicative of the high frequency portion of one of the input signals and the low frequency portion of the other, with the characteristic that the input signal providing the high frequency portion is provided in the form of the rate of change of the form of the output. Complementary filter 6, therefore, provides a velocity signal 8 by merging a velocity signal input 56 (for its low frequency data) with an acceleration signal input 2 (for its high frequency data).

A summing junction 10 subtracts XCOMPVEL on line 8 from XFILTRVEL on line 4 to provide a feedback signal on a line 12 to a proportional gain amplifier 14 and an integrator 18. The output of integrator 18 is provided to a limiter 20, which provides an output signal on a line 22 that is added by summing junction 24 to the output of amplifier 14 provided on a line 16 to provide a signal on a line 26 to summing junction 28. Summing junction 28 adds the signal on line 26 to XACCEL on line 2 to provide a signal on a line 30 to an integrator 32. The output of integrator 32 is provided to a limiter 34 which provides XCOMPVEL on line 8.

XFILTRVEL on line 4 is provided by a lead-lag filter 36 whose input is provided on a line 38 by a rate limiter 40. Rate limiter 40 is comprised of a summing junction 42 which provides a signal on a line 44 to a limiter 46 that provides a signal to an integrator 48, the output of which is fed back on line 38 to summing junction 42. Summing junction 42 subtracts the feedback on line 38 from a signal on a line 52 provided by a limiter 54. Limiter circuit 54 is provided an aircraft longitudinal, velocity signal (DOPPLER XVEL) on a line 56 by a velocity measurement system (not shown), such as a Doppler radar system.

A velocity transformation circuit 60 transforms signal XCOMPVEL on line 8, which is a ground-plane-referenced signal, to an inertial-coordinate-referenced, longitudinal, complementary, velocity signal (XINERTVEL) provided on a line 62 by utilizing aircraft heading according to the following equation:

$$XINERTVEL = XCOMPVEL * COS(PHI) - YCOMPVEL * SIN(PHI)$$

where:
XINERTVEL = inertial-coordinate-referenced, longitudinal, complementary, velocity signal;
XCOMPVEL = ground-plane-referenced, longitudinal, complementary, velocity signal provided on line 8;
PHI = HEADING signal indicative of aircraft heading with the respect to magnetic north provided on a line 64 by a heading measurement device, such as a compass;

YCOMPVEL = ground-plane-referenced, lateral, complementary, velocity signal provided on a line 66 by a complementary filter identical to filter 6 but utilizing lateral acceleration and filtered lateral Doppler velocity inputs.

A complementary filter 68 similar to filter 6 utilizes XINERTVEL on line 62 and a filtered, longitudinal, GPS position signal (FILTRPOS) on a line 72 to provide an inertial-coordinate-referenced, longitudinal, complementary, position signal (XCOMPPOS) on a line 70.

A summing junction 74 subtracts XCOMPPOS on line 70 from XFILTRPOS on line 72 to provide a feedback signal on a line 76 to a proportional gain amplifier 78, which provides an output on a line 80, and an integrator 82, which provides an output signal to a limiter 84. Limiter 84 provides a signal on a line 86 which is added to the signal on line 80 by a summing junction 88 to provide a signal on a line 90 to a summing junction 92. Summing junction 92 adds the signal on line 90 with XINERTVEL on line 62 to provide a signal on a line 94 to an integrator 96. The output of integrator 96 is provided to a limiter 98 which provides XCOMPPOS on line 70.

Integrator 96 is controlled by a binary HOVERHOLD signal (described in further detail in FIG. 2) provided on a line 100. A logic high HOVERHOLD signal indicates the flight parameters of the aircraft are acceptable for engagement of the hoverhold system of the present invention. Integrator 96 integrates the signal provided on line 94 when HOVERHOLD is a logic high and provides a zero magnitude output when HOVERHOLD is a logic low.

XFILTRPOS on line 72 is a filtered, longitudinal, GPS position signal provided by the output of a limiter 101 which is provided a position error signal on a line 102 by a transient free (TF) synchronizer circuit 103. The TF synchronizer 103 is provided a signal on a line 114 from the output of a low pass filter that filters noise from a longitudinal position signal (GPS XPOS) provided on a line 116 by a position sensing system (not shown), such as a GPS or TACNAV system. Synchronizer circuit 103 provides an error signal as the difference between a desired position and current position and is controlled by the HOVERHOLD signal provided on line 100. When HOVERHOLD is a logic low, the TF synchronizer 103 provides zero output. When HOVERHOLD is a logic high, the TF synchronizer 103 provides a position error signal indicative of the difference between the aircraft's longitudinal position at the HOVERHOLD low to high transition and the current longitudinal position.

Figure 3:
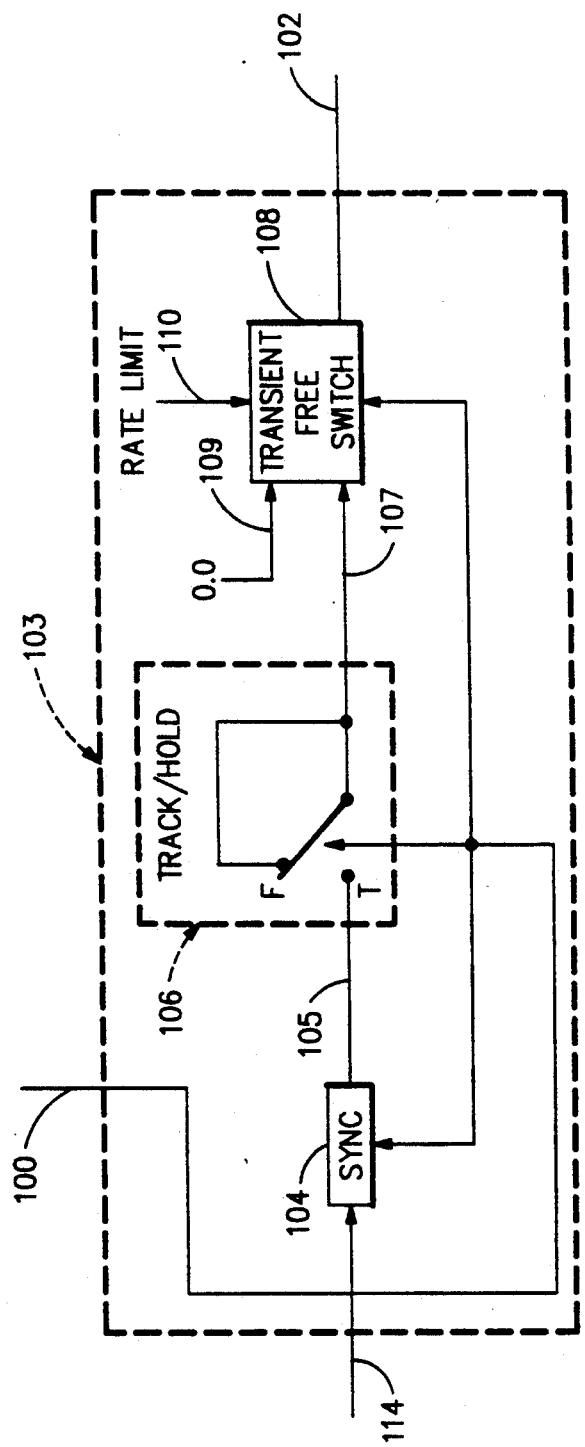
FIG. 3 is an illustration of a transient free synchronizer of FIG. 1, in accordance with the present invention.

The TF synchronizer 103 is illustrated in FIG. 3. A conventional synchronizer 104 receives the signal on the line 114. When HOVERHOLD is logic low, the output of the synchronizer 104 is equal the input signal on the line 114 minus a stored trim value. The stored trim value is the value that is stored when the HOVERHOLD signal on the line 114 transitions from logic high to logic low. When HOVERHOLD transitions from logic high to low, the signal on a line 105 is set equal to zero. The signal on the line 105 is then input to a track-/hold function 106, which allows the signal on the line 105 to pass onto a line 107 when HOVERHOLD is logic high, and retains the past value of the signal 107 when HOVERHOLD is logic low. The signal on the line 107 is input to a transient free switch 108 which smoothly transitions, between the signal on the line 107 and a signal on a line 109, on command from HOVERHOLD. The switch selects the signal on the line 107 when HOVERHOLD is logic high, and the signal on the line 109 when HOVERHOLD is low. The transition between the signals on lines 107,109 occurs as a function of a rate limit value on a line 110, which can be a predetermined constant. The conventional synchronizer 104, track/hold function 106, and the TF switch combine to provide for a smooth transition of the signal on the line 102 when commanded by HOVERHOLD.

The inertial-coordinate-referenced, longitudinal, complementary, position signal, XCOMPPOS on line 70 is provided to a synchronizer circuit 122. Synchronizer 122 works similarly to circuit 103 with the exception that it is controlled by a delayed HOVERHOLD signal provided on a line 126 by a delay circuit 128 which delays transitions of HOVERHOLD provided on line 100 by one half second. Synchronizer 122, therefore, provides an inertial-coordinate-referenced, complementary, longitudinal, position error signal (XPOSERR) on a line 130 indicative of the drift in aircraft longitudinal position from the position when the aircraft entered into hover.

The XPOSERR signal on line 130 is provided to a transformation circuit 132 which transforms the inertial-coordinate-referenced signal XPOSERR to a ground-plane-referenced signal (XGPERR) provided on a line 134 by utilizing aircraft heading according to the following equation:

$$XGPERR = XPOSERR*\cos(PHI) + YPOSERR*\sin(PHI)$$

where:
XGPERR = ground-plane-referenced, complementary, longitudinal, position error signal provided on line 134

XPOSERR = inertial-coordinate-referenced, complementary, longitudinal, position error signal provided on line 130

YPOSERR = inertial-coordinate-referenced, complementary, lateral, position error signal provided on a line 136 by a circuit similar to FIG. 1 but utilizing lateral acceleration, velocity, GPS position, and airspeed inputs PHI = heading angle provided on line 64 and described hereinbefore XGPERR on line 134 is provided to a proportional gain amplifier 138 and an integrator 140. The output of integrator 140 is provided to a limiter 142 which provides a signal on a line 144 to a sample & hold circuit 146. The output of circuit 146 is provided on a line 148 to a summing junction 150.

Integrator circuit 140 is controlled by a delayed HOVERHOLD signal provided on a line 154 by a delay circuit 156 which delays HOVERHOLD transitions provided on line 100 by one second.

Sample & hold circuit 146 is controlled by the outputs of two inverters 158,160. Inverter 158 inverts the delayed HOVERHOLD signal on line 154 and provides a reset signal (R) to circuit 146. Inverter 160 inverts the HOVERHOLD signal on line 100 and provides a sample & hold signal (S) to circuit 146.

When HOVERHOLD transitions from logic low to logic high, inverter 160 commands circuit 146 into a "follow" mode wherein the circuit functions as a unitary gain amplifier. After a one second delay, integrator 140 is commanded by delay circuit 156 to begin integrating the signal provided on line 134. Delay circuit 156 gives the proportional path signal time to reach the correct magnitude before integrator 140 starts integrating in order to prevent "rocking" motion.

When HOVERHOLD on line 100 transitions from high to low, inverter 160 commands circuit 146 into a "sample and hold" mode wherein the signal on line 144 is sampled and the value held on line 148. After a one second delay, inverter 158 resets circuit 146 to zero and delay circuit 156 commands integrator 140 to stop integrating (i.e. the output goes to zero). Sample and hold circuit 146 minimizes transients when the aircraft goes in and out of a hover.

Summing junction 150 adds the output of sample & hold circuit provided on a line 148 with the output of proportional gain amplifier 138 provided on a line 152 and provides the added signal on a line 162 to a limiter 164. The output of limiter 164 is provided to a FADE circuit 166 which provides a signal on a line 168 to a summing junction 170.

The FADE circuit 166 is controlled by HOVERHOLD on line 100. When HOVERHOLD transitions from low to high, the gain of FADE circuit 166 changes from zero to one linearly with time over a one second interval. When HOVERHOLD transitions from high to low, the gain changes conversely from one to zero. Circuit 166, consequently, fades the signal provided by limiter 164 in and out as the aircraft goes in and out of a hover and prevents large transients from appearing on line 168.

The summing junction 170 adds the position error signal provided on line 168 with a conditioned wind compensation signal provided on a line 172 by a FADE circuit 174. Circuit 174 functions similarly to circuit 166 but is controlled by a digital WINDCOMP FADE signal (described in detail in FIG. 2) provided on a line 176. The input to FADE circuit 174 is provided by a limiter 178 which conditions the signal provided on a line 180 by a derivative function circuit 182 comprising a summing junction 182 which adds a signal provided on a line 184 by a proportional gain amplifier 186 to a signal on a line 188 provided by a lead-lag rate circuit 190. Derivative function circuit 182 "boosts" the signal provided on line 196 when it changes rapidly and consequently provides better aircraft hover response to wind gusts. Summing junction 170, therefore, alters the aircraft position error signal in order to anticipate the effects of wind on the aircraft.

The input to circuits 186 and 190 is provided on a line 192 by a low pass filter 194. Filter 194 filters a calculated, longitudinal, wind compensation signal (XWINDCOMP) provided on a line 196 provided by a summing junction 198 which subtracts XCOMPVEL on line 8 from a longitudinal air speed signal XAIRSPEED provided on a line 200 by an air speed measuring system (not shown), such as the Omnidirectional Air Data System manufactured by PACER Systems, Inc.

The output of summing junction 170 is a pitch command signal (PITCH CMD) provided on a line 202 utilized by a flight control system (not shown) to control aircraft longitudinal position.

A similar circuit to pitch command circuit 1 must be used to provide a roll command signal to the aircraft flight control system for controlling aircraft lateral position. The only differences between the roll command circuit and the pitch command circuit 1 are: a) the acceleration, velocity, position, and air speed inputs (the roll command circuit counterparts of the signals on lines 2, 56, 116, and 200) are indicative of parameters in the lateral axis of the aircraft; b) the lateral velocity transformation circuit (roll counterpart of circuit 60) calculates an inertial-coordinate-referenced, lateral, complementary, velocity signal YINERTVEL (roll counterpart of the signal on line 8) according to the equation:

$$YINERTVEL = XCOMPVEL*SIN(PHI) + YCOMPVEL*COS(PHI);$$

c) the position transformation circuit (roll counterpart of circuit 132) calculates a ground-plane-referenced, lateral, complementary, position error signal YGPERR (roll counterpart of the signal on line 134) according to the equation:

$$YGPERR = -XPOSERR*SIN(PHI) + YPOSERR*COS(PHI).$$

Figure 2:
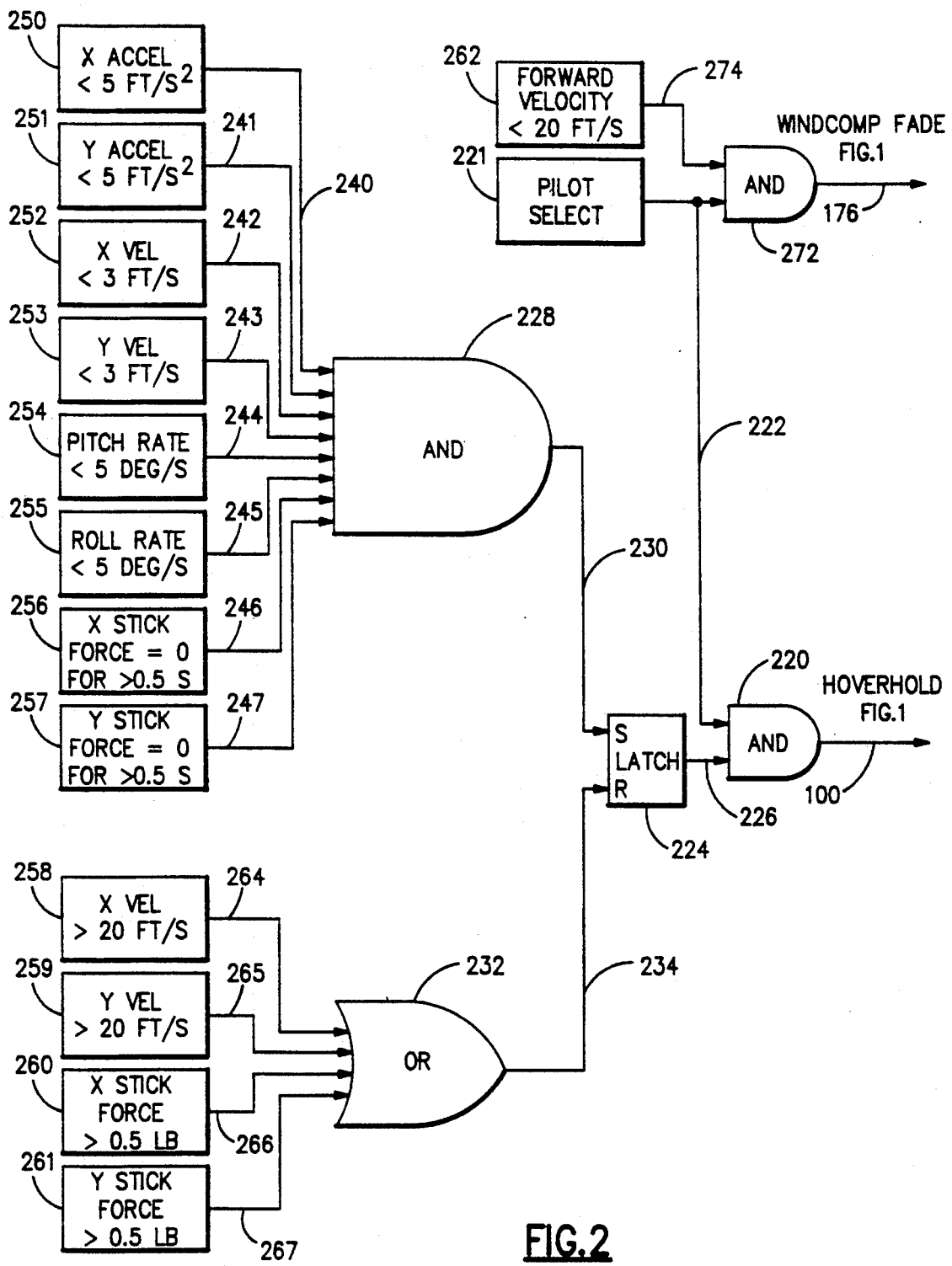
FIG. 2 is a simplified schematic diagram of the control logic for the hover hold system of FIG. 1.

Referring now to FIG. 2, the HOVERHOLD signal utilized by both the pitch command circuit 1 (line 100) and the aforementioned roll command circuit is provided by an AND circuit 220 which provides a logic high on line 100 when the output of a PILOT SELECT circuit 221 provided on a line 222 and the output of a LATCH circuit 224 provided on a line 226 are logic high.

The PILOT SELECT circuit 221 (not shown in detail herein) may be one of the many switches well known in the prior art which provides the pilot with a means to activate the automatic hover hold system of the present invention.

The LATCH circuit 224 is a bistable device having a set (S) control input and a reset (R) control input. The S input of latch circuit 224 is controlled by the output of an AND circuit 228 provided on a line 230 and the R input is controlled by the output of an OR circuit 232 provided on a line 234. When the set signal on line 230 transitions from logic low to logic high, the LATCH output signal on line 226 is set to logic high. A transition of the reset signal on line 234 from logic low to logic high resets the LATCH output signal on line 226 to logic low.

The AND circuit 228 has eight inputs provided on lines 240-247 by comparator circuits 250-257. AND circuit 228 provides a logic high signal on line 230 when the signals on lines 240-247 are logic high. Comparators 250,251 provide logic high outputs when the aircraft longitudinal and lateral accelerations, respectively, are less than five feet per second squared. Comparators 252,253 provide logic high outputs when the aircraft longitudinal and lateral velocities, respectively, are less than three feet per second. Comparators 254,255 provide logic high outputs when the aircraft pitch and roll rates, respectively, are less than five degrees per second. Comparators 256,257 provide logic high outputs when the force applied by the pilot to the flight control stick in the pitch and roll axes, respectively, is zero for more than one half second.

The OR circuit 232 is provided four inputs on lines 264-267 by comparator circuits 258-261, respectively. The OR circuit 232 provides a logic high signal on line 234 whenever any one of lines 264-267 is a logic high. Comparators 258,259 provide logic high signals when the longitudinal and lateral velocity, respectively, of the aircraft are greater than 20 feet per second. Comparators 260,261 provide respective logic high signals when the pilot displaces the flight control stick in the pitch and roll axes respectively greater than one percent of its total travel in the respective axis.

The WINDCOMP FADE signal utilized by the pitch and roll command circuits is provided on line 176 by an AND circuit 272 which has two inputs provided on lines 274,222 by comparator circuit 262 and PILOT SELECT circuit 221, respectively. The output of comparator circuit 262 is a logic high when the forward velocity of the aircraft is less than twenty feet per second.

Therefore, the hover hold system engages automatically if the pilot has engaged the PILOT SELECT circuit and the conditions of comparator circuits 250-257 have been met. The system disengages if PILOT SELECT is disengaged or any one of the conditions of comparators 258-261 are met.

Comparator circuits 250-262 are not shown in detail, but may be any of a number of circuits well known in the prior art which compare an input parameter signal with a predetermined threshold limit to provide a logic high digital output signal if the threshold limit is exceeded.

The transient free synchronizer 103 of the present invention is clearly not limited to usage in only a hover hold system. Rather the TF synchronizer may be used in any autopilot system where it is desired to capture a particular trim position, and to ensure there are no abrupt signal changes associated with capturing the trim position which can cause undesired aircraft transients. As an example, the transient free synchronizer of the present invention may be used in a trim controller for an automatic aircraft turn coordination system which is disclosed in U.S. Pat. No. 5,222,691 entitled "Automatic Turn Coordination Trim Control for Rotary Wing Aircraft", by Gold et al. In fact, it is further contemplated that this invention may be used in any digital control system in which a synchronizer is used to capture a trim position.

The present invention may be implemented using analog circuitry, dedicated digital circuitry or as a software program using circuit designs well known in the prior art. The preferred embodiment is a microprocessor based control system in which the present invention is the software program which is executable out of the microprocessor. The equivalence between analog, dedicated digital and software is illustrated (in a different context) in U.S. Pat. No. 4,294,162 (Fowler et al).

The invention may be implemented with a variety of delay times, various types of filtering and limiting, and other known design characteristics, to suit any implementation thereof.

All the foregoing changes and variations are irrelevant to the invention, it suffices a transient free synchronizer captures trim positions on command, and transitions in a smooth manner to reduce any undesirable transients on the aircraft when the new trim is captured.

Although the present invention has been shown and described with respect to a best mode embodiment thereof, it should be understood by those skilled in the art that various other changes, omissions and additions to the form an detail thereof may be made therein without departing from the spirit and scope of the invention.

We claim:

1. A transient free synchronizer, comprising: synchronizing means, responsive to an input signal value, said input signal value being indicative of the value of a variable parameter, said synchronizing means storing said input signal value when a command signal changes from high to low, said synchronizing means providing an output signal value which is equal to said input signal value when said command signal is high, and setting said output signal value equal to the difference between said stored input signal value and the present value of said input signal value while said command signal is low, said input signal value being synchronized with said stored input signal value when the difference therebetween is zero;

track hold means for providing a track signal whose value tracks said output signal value while said command signal is high, and for holding the value of said track signal constant when said command signal is low; and switching means, for providing a synchronizer output signal which is set equal to said track signal value while said command signal is high, and which is set equal to a second signal value while said command signal is low, said second signal value being indicative of a constant said switching means smoothing the transitions between said track signal value and said second signal value such that the transition between said track signal value and said second signal value occurs in a smooth, continuous manner.

2. The transient free synchronizer of claim 1, wherein said switching means further comprises means for limiting the rate of change of said synchronizer output signal.

3. The transient free synchronizer of claim 1, wherein said second signal value is equal to zero.

4. A transient free synchronizer, comprising:

synchronizing means responsive to an input signal value indicative of an aircraft trim value, for storing said input signal value when a discrete command signal changes from true to false, said stored input signal value being indicative of a reference trim value, said synchronizing means providing an output signal which is substantially equal to said input signal value while said command signal is true, and providing said output signal at a value substantially equal to the difference value between said stored input signal value and the present value of said input signal value when said command signal is false, said input signal value being synchronized with said stored input signal value when the difference therebetween is zero;

means for continuously providing a track signal which equals the value of said output signal while said command signal is true, and for holding the value of said track signal constant while said command signal is false; and transient free switching means for providing a synchronizer output signal value which tracks said track signal value while said command signal is true, for equating said synchronizer output signal value equal to a second signal value while said command signal is false, said second signal value being indicative of a constant, said transient fee switching means smoothing the transition of said synchronizer output signal value associated with selecting between said track signal value and said second signal value, such that commanded transitions of said synchronizer output signal value between said track signal value and said second signal value occur in a smooth, continuous, rate limited manner.

5. The transient free synchronizer of claim 4, wherein said second signal value is zero.

6. The transient free synchronizer of claim 4, wherein, while said command signal is false, said track signal value is held constant at a value equal to the value of said output signal at the instant before said command signal changes from true to false.

* * * * *